US007505896B2

(12) United States Patent
Parkinson (10) Patent No.: US 7,505,896 B2
(45) Date of Patent: Mar. 17, 2009

(54) METHOD AND APPARATUS FOR REATTACHING NODES IN A PARSE STRUCTURE

(75) Inventor: David J. Parkinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 10/425,960

(22) Filed: Apr. 29, 2003

(65) Prior Publication Data

US 2004/0220796 A1 Nov. 4, 2004

(51) Int. Cl.
G06F 17/27 (2006.01)
(52) U.S. Cl. .......................................................... 704/9
(58) Field of Classification Search .................. 704/1, 704/9, 10, 257
See application file for complete search history.

(56) References Cited

U.S. PATENT DOCUMENTS 5,146,406 A * 9/1992 Jensen ............................ 704/9
6,138,098 A * 10/2000 Shieber et al. .............. 704/257
6,275,791 B1 * 8/2001 Weise ............................. 704/9

OTHER PUBLICATIONS

Wagner et al., "Efficient and Flexible Incremental Parsing," ACM Transactions on Programming Languages and Systems, vol. 20, No. 5, pp. 980-1013 (Sep. 1998).

Li, W.X., "Building Efficient Incremental LL Parser by Augmenting LL Table and Threading Parse Tree," Proceedings of the 33d Annual Southeast Conference, pp. 269-270 (1995).

Harper et al., "Managing Multiple Knowledge Sources in Constraint-Based Parsing of Spoken Language," Fundamenta Informaticea, vol. 23, No. 2-4, pp. 303-353 (Jun.-Aug. 1995).

Inman, D., "Recognising Hand-Written Japanese Sentences," Proceedings of 1993 $2^{nd}$ IEEE International Workshop on Robot and Human Communication, pp. 125-129 (1993).

Harper et al., "Semantics and Constraint Parsing of Word Graphs," Proceedings of ICASSP '93, pp. 63-66, vol. 2 (1993).

Nagata et al., "A Unification-Based Japanese Parser for Speech-to-Speech Translation," IEICE Transactions on Information and Systems, vol. E76-D, No. 1, pp. 51-61 (Jan. 1993).

Wagner et al., "Incremental Analysis of Real Programming Languages," ACM Sigplan Notices, vol. 32, No. 5, pp. 31-43 (1997).

* cited by examiner

*Primary Examiner*—Angela A Armstrong
(74) *Attorney, Agent, or Firm*—Theodore M. Magee; Westman, Champlin & Kelly, P.A.

(57) ABSTRACT

A method is provided for parsing a sentence to form representations of syntactic structures in the sentence. The method includes forming a first representation of syntactic structures in the sentence. This first representation is then modified by modifying the syntactic structures to form at least two modified syntactic representations. At least two modified representations are then identified as possible representations of syntactic structures in the sentence.

20 Claims, 10 Drawing Sheets

METHOD AND APPARATUS FOR REATTACHING NODES IN A PARSE STRUCTURE

BACKGROUND OF THE INVENTION

The present invention relates to natural language processing. In particular, the present invention relates to syntactic parsing of text.

A natural language parser is a program that takes a text segment, usually a sentence, of natural language (i.e., human language, such as English) and produces a representation of the syntactic structures in the sentence. One common representation is a parse tree that represents the syntactic structure in a hierarchical manner with leaf nodes that represent the individual words of the text segment and a root node that spans the entire text segment.

In general, natural language parsers build the parse trees by applying syntax rules to the input text segment. Parsers apply these rules in either a "top-down" or a "bottom-up" manner.

In a bottom-up parser, all of the possible parts of speech for the individual words of the input text are first identified to form a set of word tokens. The parser then attempts to combine the individual word tokens into larger syntactic structures, such as noun phrases and verb phrases, by applying syntax rules to the tokens. The resulting larger structures represent candidate nodes for the parse tree. The parser continues to try to build larger and larger structures by applying syntactic rules to previously identified candidate nodes. A full parse is achieved when a node spans the entire text segment.

During the construction of the nodes, attribute-value pairs that describe the structure represented by the node are created. For example, a first token attribute and a last token attribute are associated with each node to indicate the position in the input string of the first token that the node spans and the position in the input string of the last token that the node spans. Additionally, each node has a "head" attribute that designates the primary element of the phrase represented by that node, a "prmods" attribute that designates the (potentially empty) list of modifiers found before the head in the phrase, and a "psmods" attribute that designates the (potentially empty) list of modifiers found after the head in the phrase. The number and type of attributes that are associated with a node is unlimited and is controlled by the rule used to form the node.

The computational complexity of forming the parse is a function of the number of candidate nodes that are formed. To limit the number of candidate nodes, some systems adopt a minimal attachment strategy that prevents certain candidate nodes from being formed if other candidate nodes have already been formed or are expected to be formed.

Although this minimal attachment strategy reduces the complexity of forming an initial parse structure, it can result in parse trees that are less than optimal. To address this, many parsing systems re-examine the initial parse trees to determine if each tree can be changed to provide a better parse.

The goal of such systems is to provide a single improved parse tree for each initial parse tree. Thus, even though an initial parse tree could be modified in several different ways, parsing systems of the prior art have been limited to providing only one modified parse tree for each initial parse tree.

Such systems are not desirable because the syntactic rules used to identify an improved parse have a limited ability to resolve syntactic ambiguities in the initial parse. As a result, the best parse for the sentence may not be produced by the syntactic parser. Thus, a system is needed that provides better syntactic parses of sentences.

SUMMARY OF THE INVENTION

A method is provided for parsing a sentence to form representations of syntactic structures in the sentence. The method includes forming a first representation of syntactic structures in the sentence. This first representation is then modified by modifying the syntactic structures to form at least two modified syntactic representations. At least two modified representations are then identified as possible representations of syntactic structures in the sentence.

DETAILED DESCRIPTION OF ILLUSTRATIVE EMBODIMENTS

Figure 1:
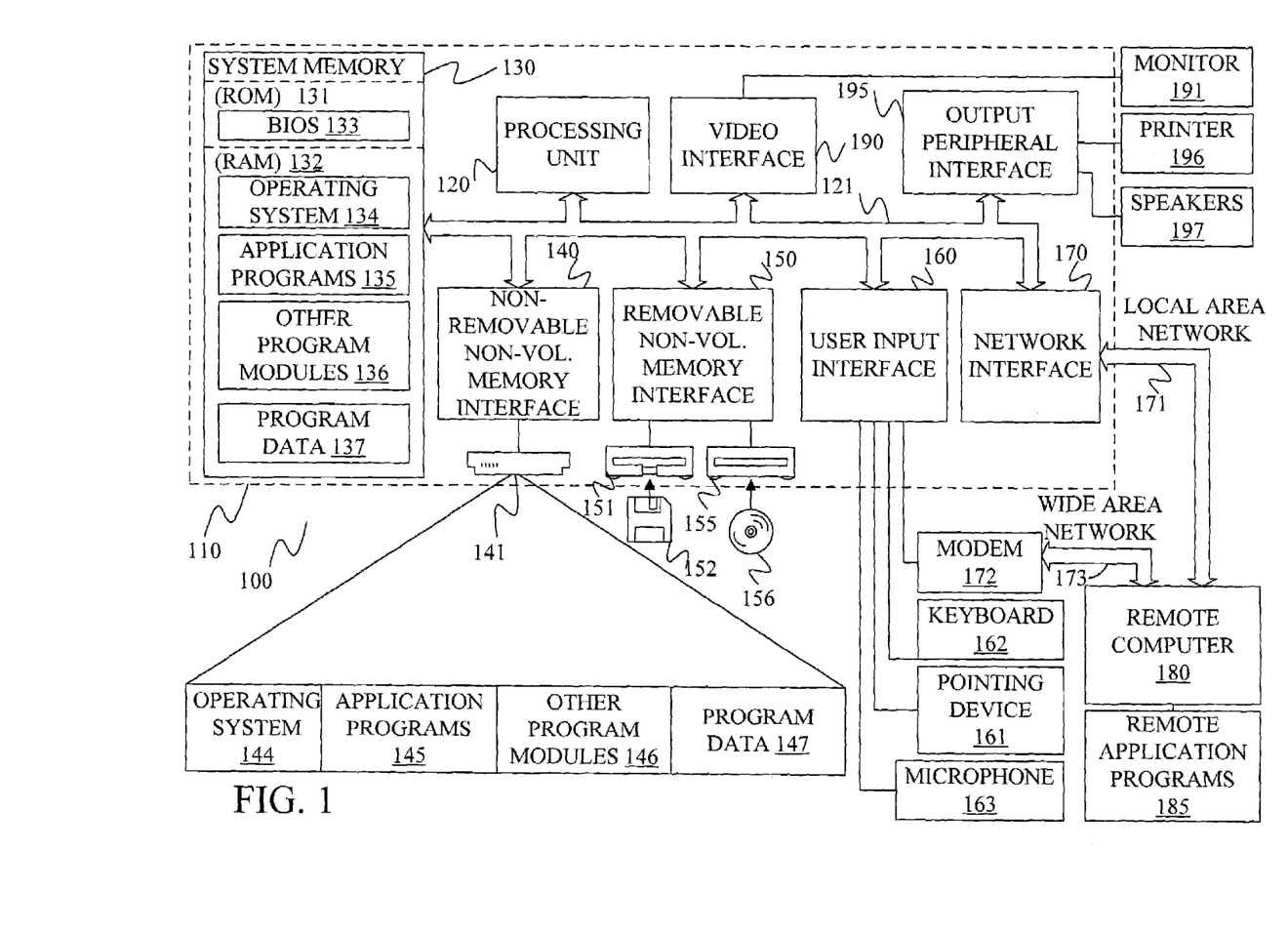
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
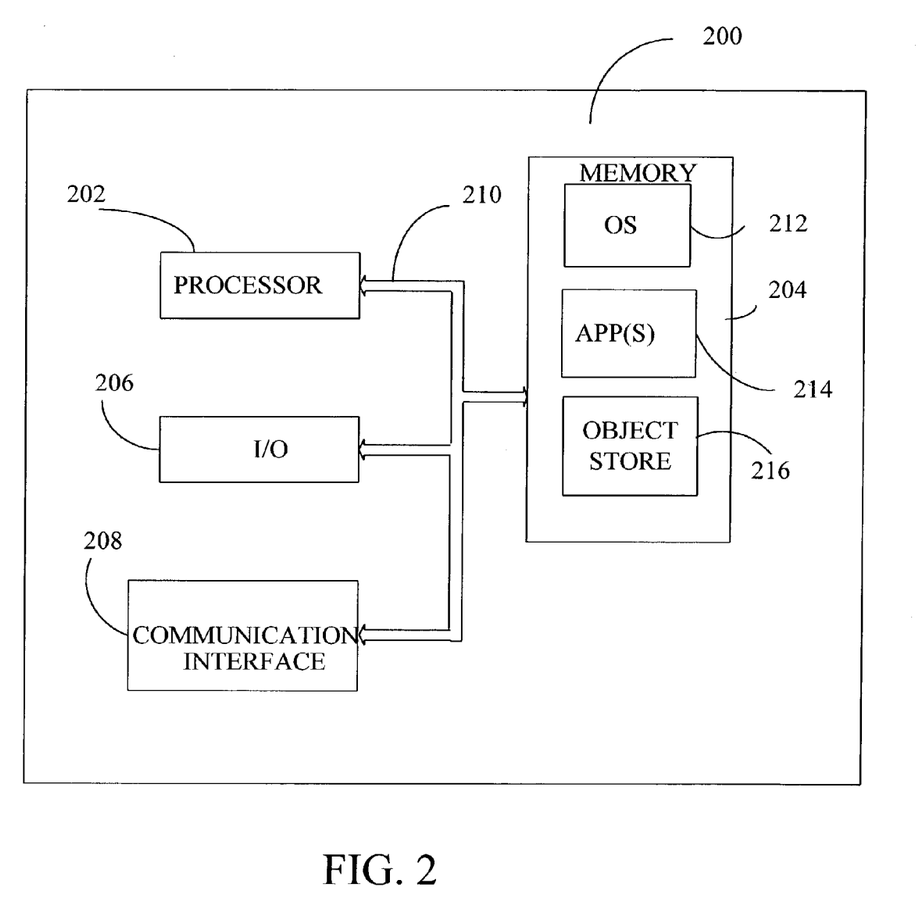
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
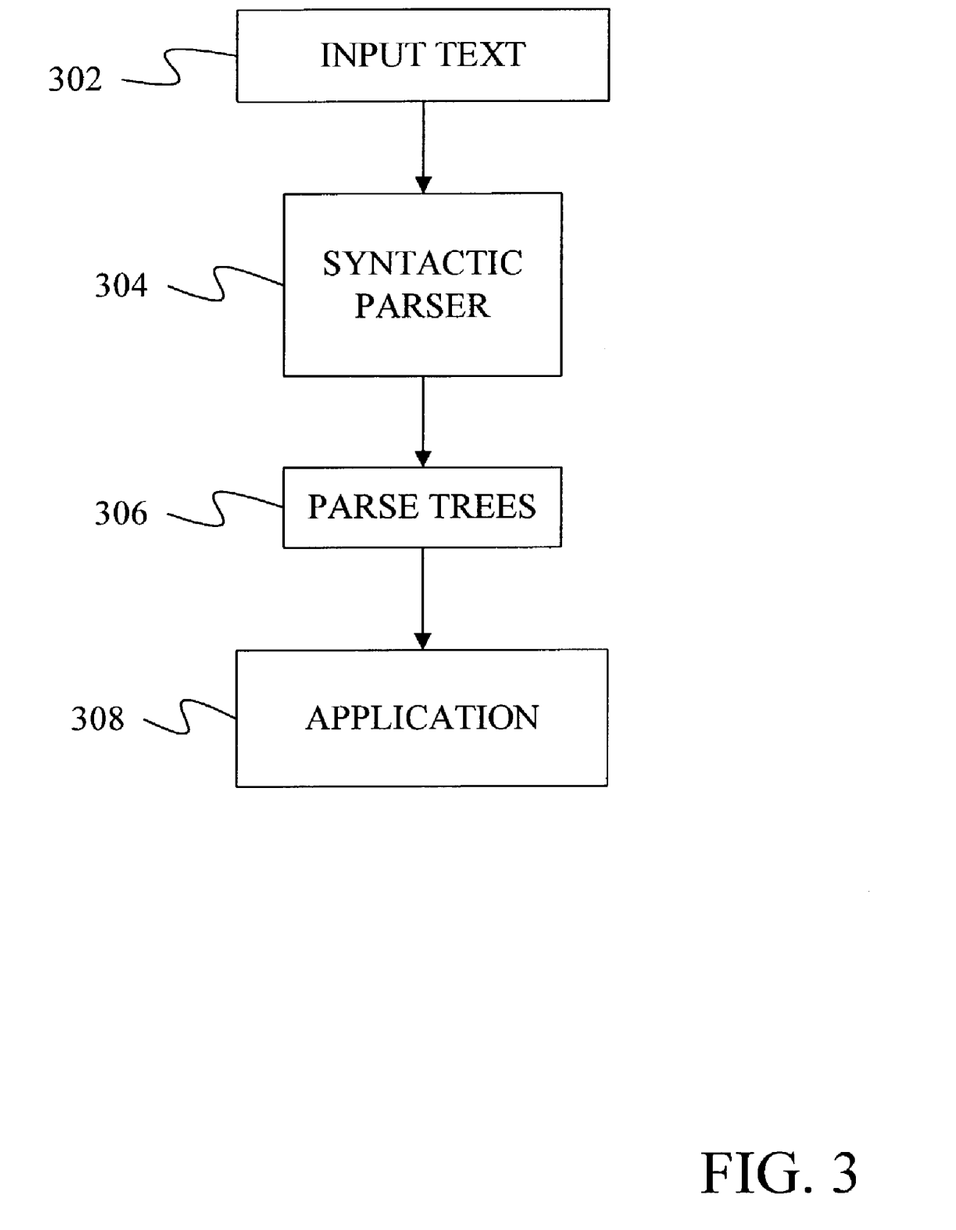
FIG. 3 is a block diagram of a natural language processing system.

As shown in FIG. 3, the present invention is a natural language parser 304, which converts a text 302 into a set of possible syntactic structures 306. Unlike parsers of the prior art, natural language parser 304 is able to generate multiple possible syntactic structures based on a single syntactic parse structure. These parse structures are provided to an application 308 which utilizes the syntactic structures to perform a natural language function. As part of performing the natural language function, many of the applications 308 are able to resolve ambiguities between multiple syntactic structures in order to select one structure as containing the proper syntax for the sentence. Thus, the present invention provides a more accurate selection of the syntax structure of a sentence by using the parser to generate multiple improved parses from an initial parse and allowing an application that has access to different information to select one of the improved parses.

Figure 4:
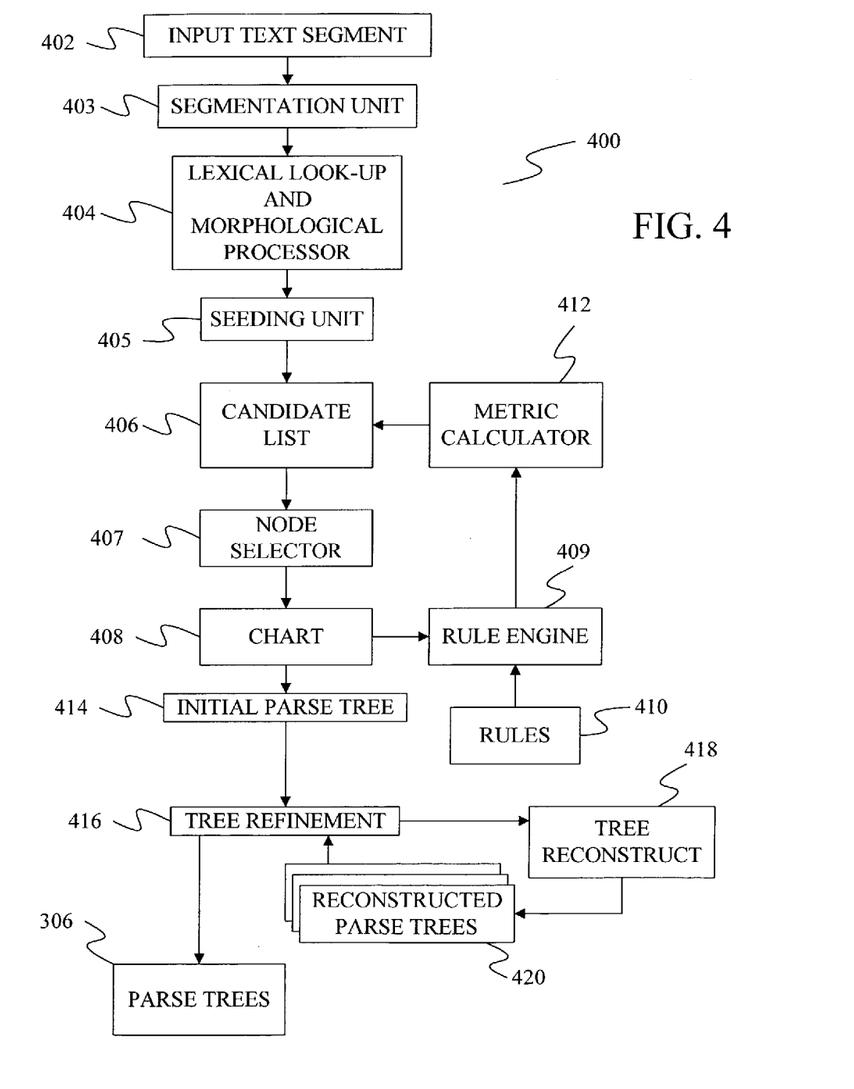
FIG. 4 is a block diagram of a syntactic parser with reattachment under one embodiment of the present invention.

FIG. 4 provides a block diagram of a natural language parser 400 in which the present invention may be practiced. In parser 400, a segmentation unit 403 divides an input text segment 402 into individual words, which are passed to a morphological processor and lexicon look-up 404 to identify possible parts of speech for each word. Under some embodiments, the morphological processor normalizes the morphological form of the words, if needed, before the words are applied against the lexicon to find the parts of speech. Each word/part-of-speech pair that is identified from the text segment forms a token that is inserted into a candidate list 406 as a starting node by a seeding unit 405.

An initial parse tree is then constructed through an iterative process. During each iteration, a single candidate node is promoted from candidate list 406 to a node chart 408 by a node selector 407. The promoted node is then tested against rules in a rule grammar 410 by a rule engine 409 to see if the promoted node can be transformed into a higher level node using one of the rules. This can occur by applying a unary rule to the promoted node by itself or by applying a rule that combines the promoted node with one or more of the nodes in node chart 408.

During testing, the phrase types of the nodes under consideration are compared to the phrase types required by a rule. For example, a rule may take a verb phrase and a noun phrase to form a larger verb phrase. For such a rule, the promoted node and at least one other node in the node chart must provide the phrase types of noun phrase and verb phrase in order for the conditions of the rule to be satisfied. If the appropriate phrase types are not present in the node chart, the next rule in rule set 410 is examined.

Note that under some embodiments, the rules have additional conditions beyond the phrase types. For example, a rule may require number agreement (singular or plural) between a noun phrase and a verb phrase. In addition, the rule may require a particular phrase level for one or more of the constituent nodes.

When the node chart contains nodes that satisfy a rule, the rule is executed to form a new node. This execution includes determining the values for a set of attributes that describe the structure of the node as well as the values for attributes that define relationships found in the phrase represented by the node. For example, the subject, object, indirect object, and lemma form of a head verb in a clause may be determined as well as the first token and last token spanned by the node.

The new node formed by executing the rule may then be scored using a metric calculator 412. The score, if any, assigned to a node, is then used to determine which node to promote next to the chart. Any of a large number of different metrics may be used to score the node. For example, the frequency of the node type, the parts of speech of the tokens to the immediate left and right of the node, the headword associated with the node, the phrase level of the node and the syntactic history of the node may all be used.

The scored node is inserted into candidate list 406. Under some embodiments, candidate list 406 is sorted based on the score of each node, so that the node with the highest score is at the top of the candidate list. At the beginning of the next iteration, this top-most candidate node is promoted to the node chart.

The iterations described above continue until one or more nodes are formed in node chart 408 that span the entire input segment. At least one of these final nodes is then selected as an initial parse tree 414.

A tree refinement module 416 and a tree reconstruction module 418 then perform a recursive procedure that constructs a set of alternative syntactic structures for each of the initial parse trees. One embodiment of this recursive procedure is shown in the flow diagram of FIG. 5.

Figure 5:
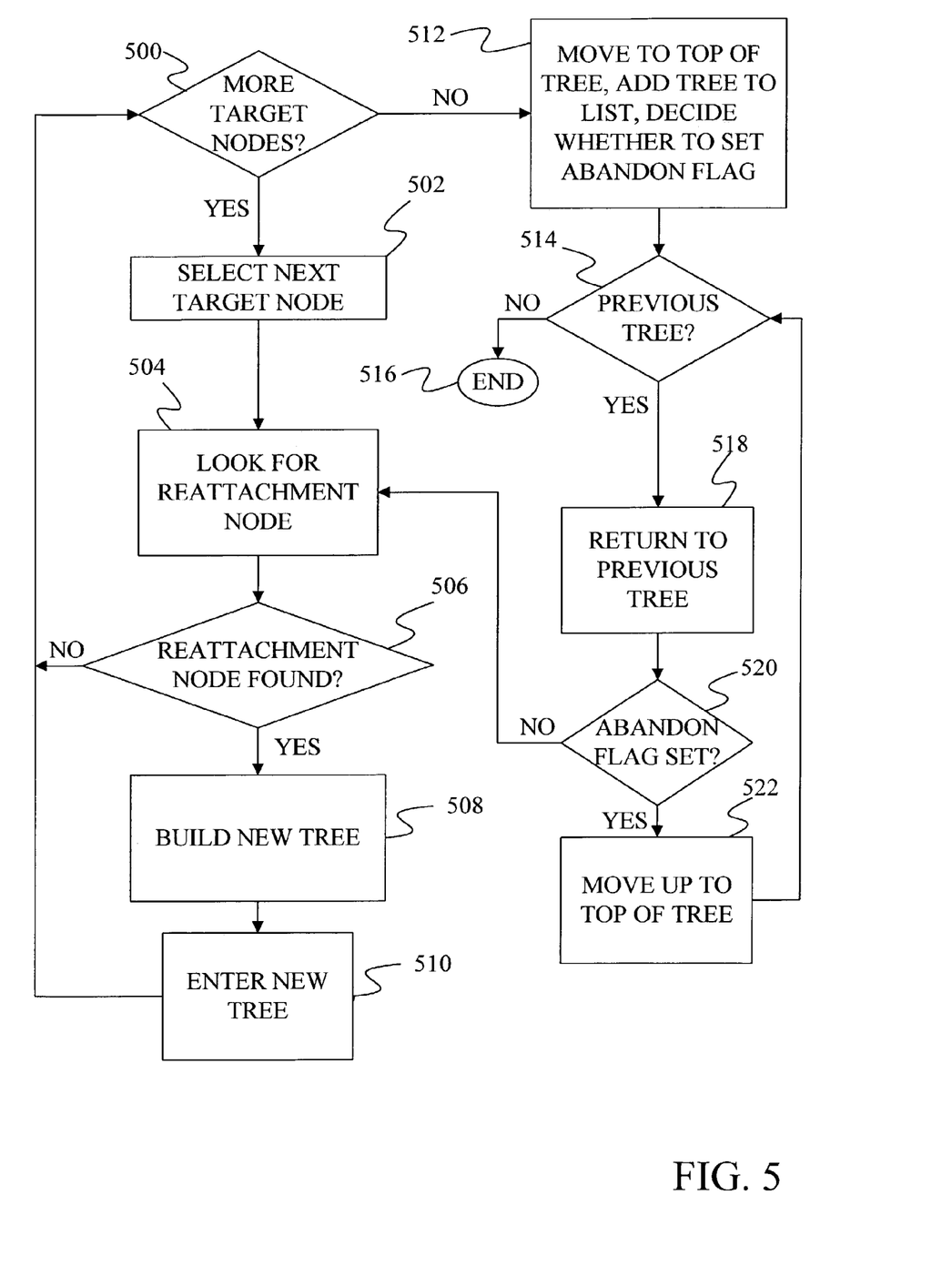
FIG. 5 is a flow diagram of a method of reconstructing a parse tree under an embodiment of the present invention.

At step 500, the tree refinement module 416 determines if there are any nodes in the initial parse structure 414 that should be used as target nodes for possible reattachments. This search begins at the root or top node of the tree and proceeds in a left-to-right depth-first manner. For example, in the initial parse tree of FIG. 6, the search of step 500 begins at node 600 for "DECL1", which is a declarative sentence node that spans the entire input sentence.

To reduce the number of nodes that need to be considered, only nodes that are the "maximal projection" of a head are used as possible target nodes. The head of a node is the word or phrase that is the focus of the node. The "maximal projection" of a head is the topmost node in a chain of nodes that share the same head. For example, in FIG. 6, nodes 602, 604, 606, and 600 all share the same head of "dropped." Since node 600 is the topmost of these nodes, it is the maximal projection for the head VERB "dropped."

Figure 6:
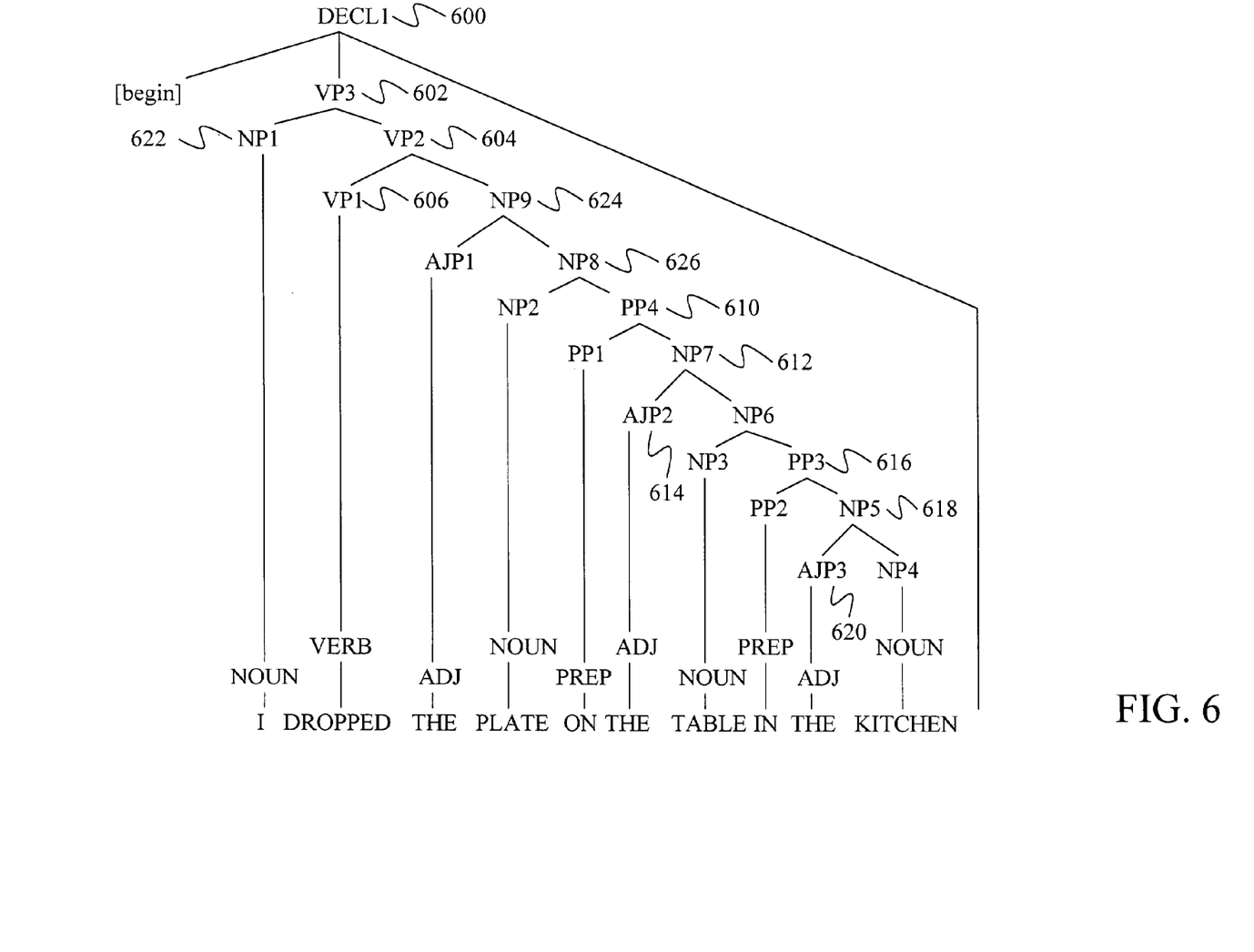
FIG. 6 is an initial representation of a syntactic structure of a sentence.

In the example of FIG. 6, node 600 is identified at step 500 as a possible target node that needs to be evaluated. As a result, tree refinement module 416 designates node 600 as a target node for reattachment at step 502 and proceeds to step 504 where it looks for a node below node 600 that can be reattached to node 600. Under one embodiment, this search is performed by traversing the right edge of the target node for reattachment, again considering only maximal projections as candidate reattachment nodes. In this example, only prepositional phrase maximal projection nodes will be considered as valid reattachment nodes, although under some embodiments of this invention, other phrase types will also be considered as valid reattachment nodes. In the example of FIG. 6, the nodes to be considered as candidate reattachment nodes comprise node 610(PP4), which is a prepositional phrase node, node 612(NP7), which is a noun phrase node, node 616(PP3), which is a prepositional phrase node, and node 618(NP5), which is a noun phrase node. Note that node 624(NP9), which is a noun phrase node, is not considered as a candidate reattachment node since it is attached to the right side of a node that shares the same head as node 600 and thus is considered to be attached to node 600.

If a reattachment node is found at step 506, a new tree is built at step 508 by passing the initial tree, the identity of the target node and the identity of the reattachment node to a tree reconstruction module 418, which builds a reconstructed parse tree 420 by reattaching the reattachment node to the target node. The process of building the new tree involves applying well known reattachment rules to construct the tree; these rules are drawn from the same set of rules as are used to construct the initial parse tree 414. Note that the reattachment node can be attached to a node that shares the same head as the target node instead of the target node itself if a rule provides for such a reattachment.

Figure 7:
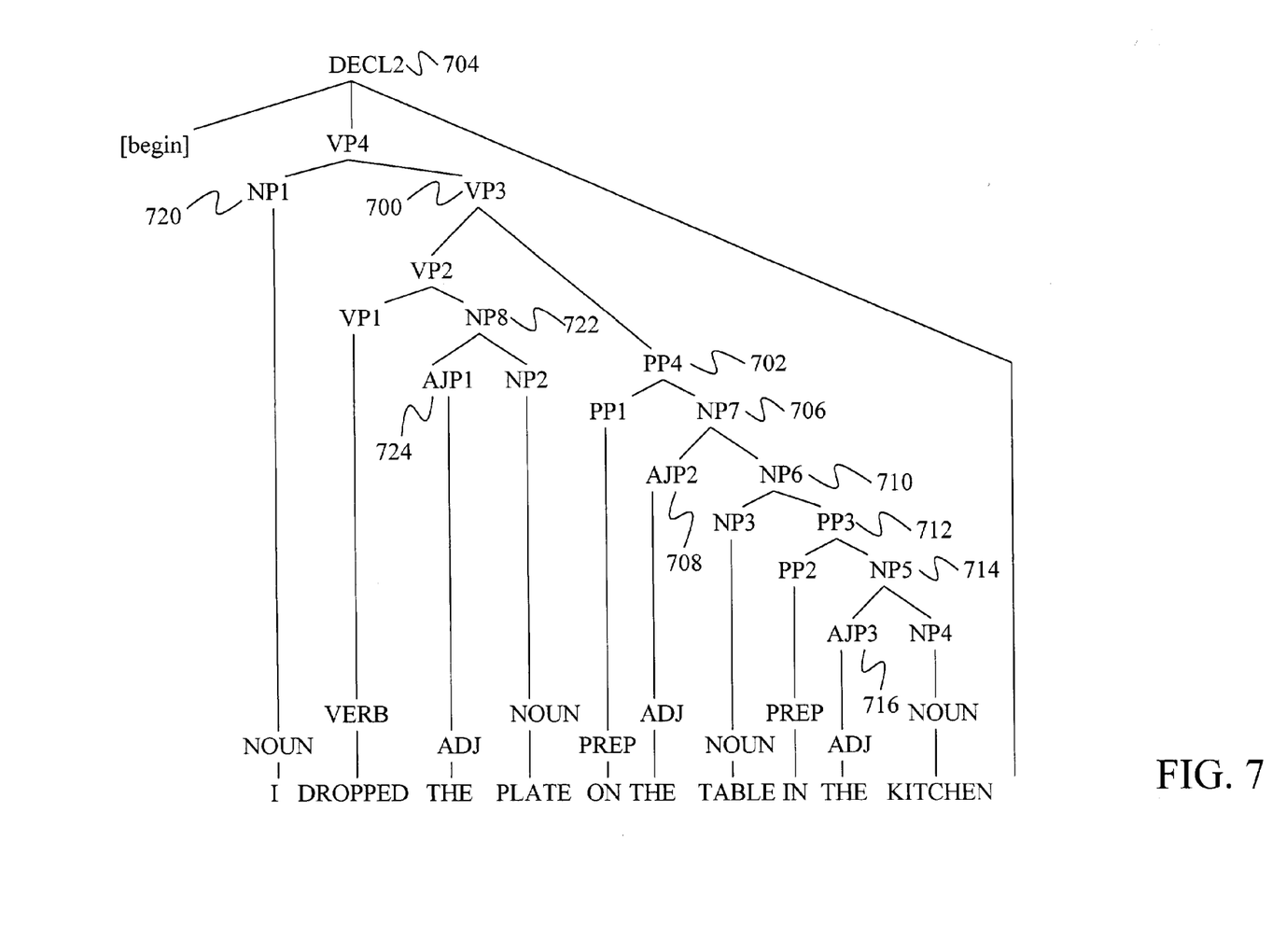
FIG. 7 is a modified representation of the initial representation of FIG. 6.

FIG. 7 provides an example of a reconstructed tree that is constructed from the initial parse tree of FIG. 6 by reattaching node 610(PP4) to node 604(VP2), which shares the same head as maximal projection node 600. In FIG. 7, node 700 (VP3) is equivalent to node 604(VP2) of FIG. 6 and node 702(PP4) is equivalent to node 610(PP4) of FIG. 6.

After the new tree is constructed, the process of FIG. 5 continues at step 510 where tree refinement module 416 enters the new tree at the top or root node, such as root node 704 of FIG. 7. The process then returns to step 500 where tree refinement module 416 determines if there are any nodes in the tree that need to be considered as possible target nodes. To make the processes more efficient, the method moves directly to the target node that accepted a reattachment to form the new tree. Moving to this node in the new tree without considering the nodes that would otherwise be considered in the left-to-right depth-first search also eliminates the construction of duplicate trees.

In the example of FIG. 7, this involves selecting maximal projection node 704(DECL2) as the target node at step 502. The process of FIG. 5 then continues at step 504, by traversing the right edge of node 704(DECL2), again considering only maximal projections as candidate reattachment nodes. This involves searching nodes 706(NP7), before finding that node 712(PP3) can be reattached to node 704 at step 506. Note that node 702(PP4), which is a prepositional phrase node, is not considered as a candidate reattachment node since it is attached to the right side of a node that shares the same head as node 704(DECL2) and thus is considered to be attached to node 704.

Figure 8:
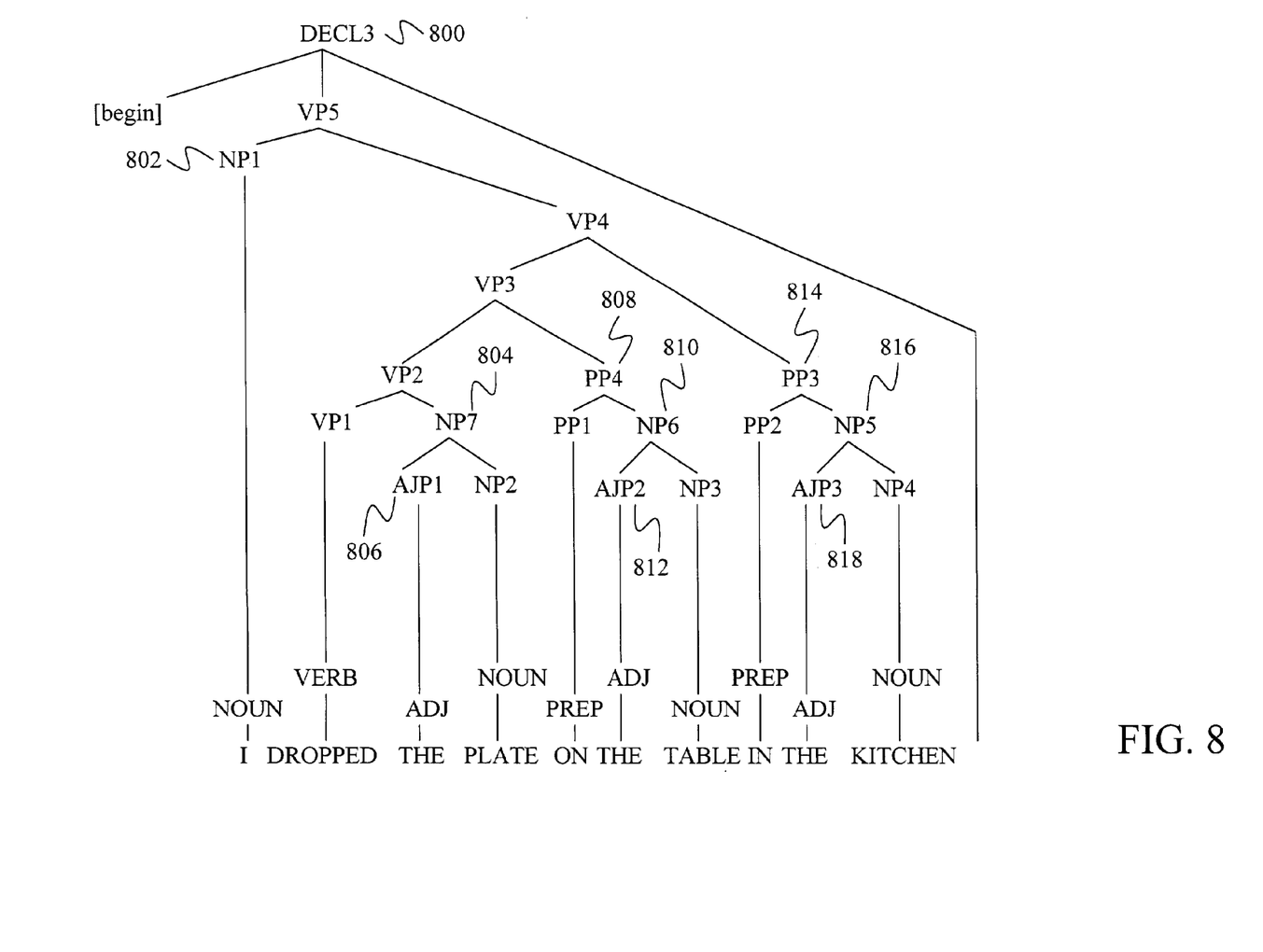
FIG. 8 is a modified representation of the modified representation of FIG. 7.

At step 508, the reconstructed parse tree of FIG. 7 is passed to tree reconstruction module 418 together with an indication that node 704(DECL2) is the target node and node 712(PP3) is the reattachment node. Tree reconstruction module 418 reattaches node 712(PP3) to node 700(VP3), which has the same head as maximal projection node 704(DECL2). This results in a new tree, which is shown in FIG. 8. At step 510, tree refinement module 418 enters the tree of FIG. 8 at the root node and the process returns to step 500. Tree refinement module 416 then repeats steps 500, 502, 504 and 506 for each maximal projection node in parse tree of FIG. 8. This involves repeating these steps for nodes 800(DECL3), 802(NP1), 804 (NP7), 806(AJP1), 808(PP4), 810(NP6), 812(AJP2), 814(PP3), and 816(NP5), and 818(AJP3). In the example of FIG. 8, no reattachment nodes are found in steps 504 and 506 for any of these possible target nodes. As such, no new trees are constructed from the parse tree of FIG. 8.

After tree refinement module 416 has searched for but failed to find reattachment nodes for target node 818(AJP3), there are no further target nodes to be considered at step 500, and the process continues at step 512, where the tree refinement module 416 returns to the root node of the tree of FIG. 8 before adding the tree to the list of syntactic parses 306 that will be provided to the application 308 by the syntactic parser.

At step 512, tree refinement module 416 also determines if the previous tree that was modified to form the current tree should be abandoned because the current tree is better than the previous tree or any further tree that can be formed from the previous tree. This determination involves applying a set of heuristic rules to the current tree and the previous tree. If the previous tree is to be abandoned, a flag is set for the previous tree at step 512. For example, upon exiting the tree of FIG. 8, tree refinement module 416 determines whether the previous tree of FIG. 7 should be abandoned.

At step 514, tree refinement module 416 determines if there is a previous tree that was modified to form the current tree. If there are no previous trees, this is the initial parse tree 414 and the process ends at step 516. If there was a previous tree, tree refinement module 416 returns to the previous tree at step 518, at the same target node and reattachment node it was at when it instructed tree reconstruction module 418 to construct the last tree.

At step 520, the abandon flag for the previous tree is examined to determine if the tree should be abandoned in favor of another tree. If the abandon flag is set to true, tree refinement module 416 moves to the top of the tree at step 522 before determining if there was a previous tree to this tree at step 514. If there is a previous tree, steps 518, 520, and 522 are repeated for the previous tree.

If the abandon flag has not been set for a tree at step 520, the process continues at step 504 where the search for another reattachment node for the target node continues. This search begins with the node after the node that was reattached to the current target node to form a new tree. For example, upon returning to the tree of FIG. 7 from the tree in FIG. 8 at step 518, the process of searching for a reattachment node for target node 704 of FIG. 7 continues after node 712 at maximal projection node 714(NP5). Node 714(NP5) is evaluated at step 504 and is determined not to be a reattachment node for target node 704. Since no reattachment node is found at step 506, the process continues in the parse tree of FIG. 7 by returning to step 500 and repeating steps 500, 502, 504, and 506 for each additional possible target node in the tree. This involves repeating these steps for each of the maximal projection nodes 720(NP1), 722(NP8), 724(AJP1), 702(PP4), 706(NP7), 708(AJP2), 712(PP3), 714(NP5), and 716(AJP3).

In the example of FIG. 7, tree refinement module 416 is not able to identify a reattachment node for any of these maximal projection nodes. As a result, after node 716(AJP3) is reached, there are no further target nodes to evaluate at step 500 and the process continues at step 512 where the tree of FIG. 7 is added to the list of parse structures 306.

At step 514, it is determined that there is a previous tree, and the process returns to the previous tree shown in FIG. 6 at step 518. Since the abandon flag for the tree of FIG. 6 has not been set at step 520, the process continues at step 504 where the search for a reattachment node for target node 600 (DECL1) continues beginning after node 610(PP4). During this search, node 612(NP7) is considered as a candidate reattachment node before reattachment node 616(PP3) is found.

Figure 9:
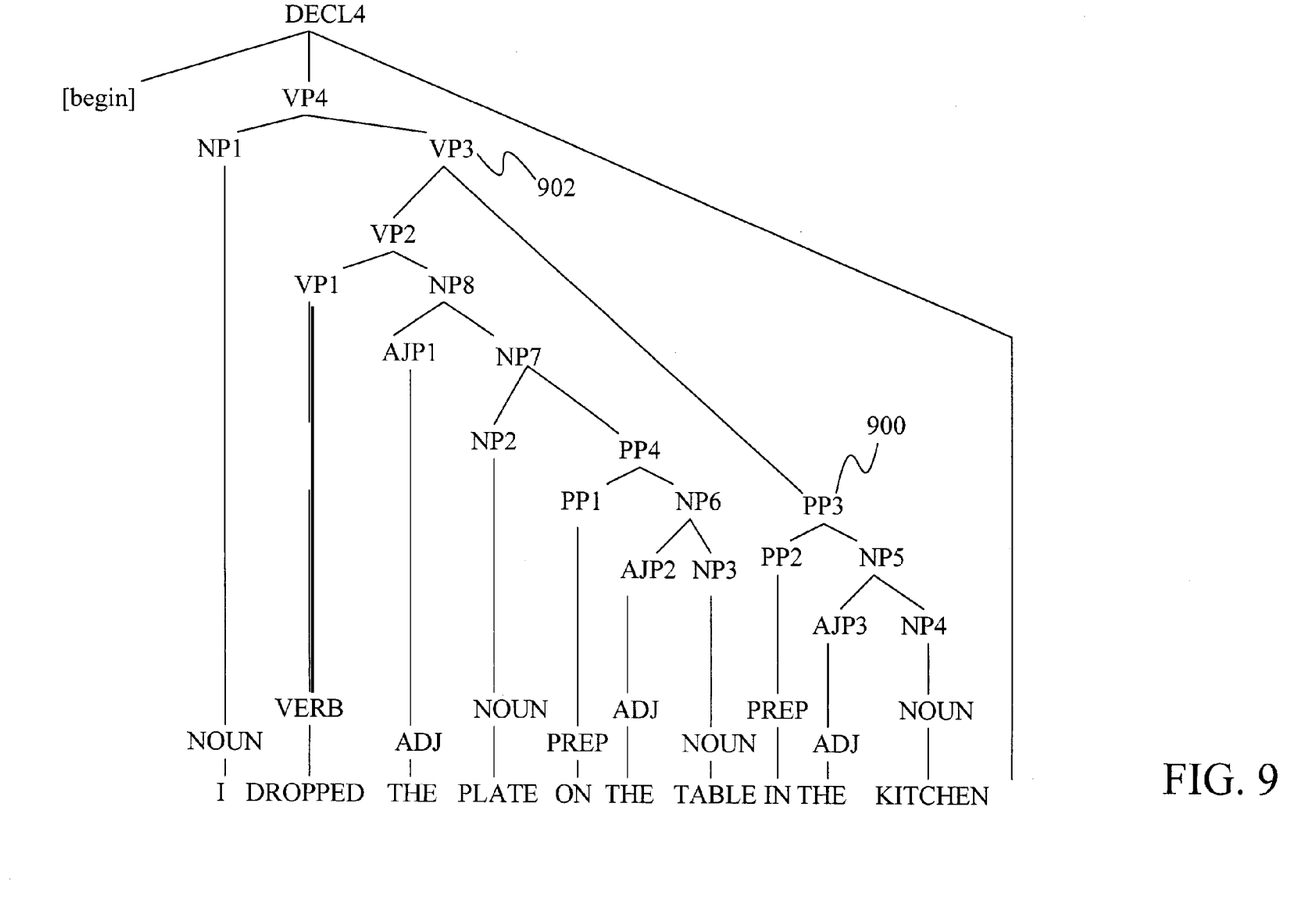
FIG. 9 is a modified representation of the initial representation of FIG. 6.

Since a reattachment node is found at step 506, the process continues at step 508 where a new tree is formed by reattaching node 616(PP3) to node 600(DECL1). This results in the tree of FIG. 9 where node 900(PP3), which is equivalent to node 616(PP3) of FIG. 6 has been reattached to node 902 (VP3), which is equivalent to node 604(VP2) of FIG. 6 and which shares the same head as maximal projection node 600(DECL1). At step 510, the new tree of FIG. 9 is entered at its root node and the processes returns to step 500, where tree refinement module 416 repeats steps 500, 502, 504, and 506 for each maximal projection node in the tree. During this process, tree refinement module 416 determines that there are no reattachment nodes for any of the maximal projection nodes. After the last maximal projection node has been considered at step 500, the structure of FIG. 9 is added to the list of structures 306 at step 512 before returning to the tree of FIG. 6 at step 518.

At step 520, the abandon flag has not been set for the tree of FIG. 6, and the process continues at step 504 where the remainder of the tree after node 616 is searched to see if there are any other reattachment nodes for target node 600 (DECL1). At step 506, there are no further reattachment nodes for target node 600(DECL1) so the process continues at step 500 where it is determined that there are additional target nodes to be evaluated. At step 502, the next maximal projection node 622(NP1) is selected and a search for a reattachment node is performed for node 622(NP1) at step 504. No reattachment node is found at step 506 and the process returns through step 500 to step 502 to select the next maximal projection node 624(NP9).

The maximal projection nodes along the right edge of node 624(NP9) are then searched at step 504 to determine if any of those nodes can be reattached to node 624(NP9). Since node 610(PP4) is already attached to node 626(NP8), which shares the same head as node 624(NP9), it is not considered eligible for reattachment. Thus, the search of step 504 involves examining node 612(NP7) before finding that node 616(PP3) can be reattached to node 624(NP9).

Figure 10:
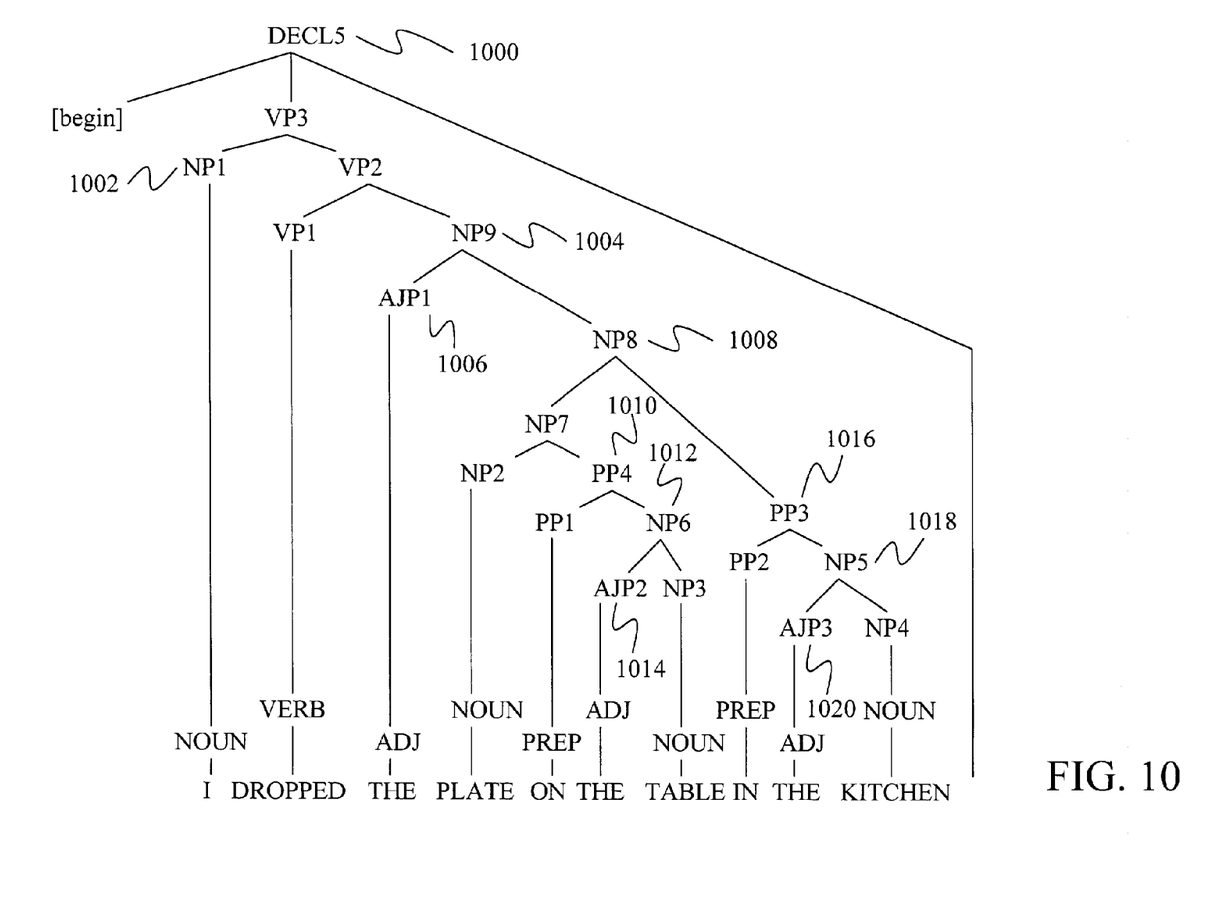
FIG. 10 is a modified representation of the initial representation of FIG. 6.

At step 508, a new tree is built by tree reconstruction module 418 as shown in FIG. 10 by reattaching node 616 (PP3) to target node 624(NP9). During the reattachment, node 616(PP3) is actually reattached to node 626(NP8), which shares the same head as node 624(NP9) and is located along the right edge of 624(NP9). In FIG. 10, nodes 1016 (PP3), 1004(NP9) and 1008(NP8) are equivalent to nodes 616(PP3), 624(NP9) and 626(NP8) of FIG. 6.

The process of FIG. 5 continues at step 510 where the tree of FIG. 10 is entered at the root node DECL5(1000) before returning to steps 500 and 504. At step 504, tree refinement module selects target node 1000(DECL5) and then proceeds to step 504 where it searches for additional reattachment nodes that can be attached to node 1000. No reattachment nodes are found for node 1000 at step 506. Steps 500, 502, 504, and 506 are then repeated for the remaining maximal projections in the tree of FIG. 10. In particular, the steps are repeated for nodes 1002(NP1), 1004(NP9), 1006(AJP1), 1010(PP4), 1012(NP6), 1014(AJP2), 1016(PP3), 1018(NP5) and 1020(AJP3).

Steps 500, 502, 504, and 506 do not find any reattachment nodes for any of the target nodes. After node 1020 has been processed, there are no further target nodes to evaluate at step 500 and the process continues at step 512, where the parse structure of FIG. 10 is added to the list of structures 306 formed from the initial parse structure. The process then returns to the tree of FIG. 6 at step 518.

Since the abandon flag has not been set for the parse structure of FIG. 6, the process continues at step 504 where the search for a reattachment node for node 624(NP9) continues after node 616(PP3). At step 506, no other reattachment node can be found for node 624(NP9) and the process returns to repeat steps 500, 502, 504 and 506 for each of the remaining maximal projection nodes 610(PP4), 612(NP7), 614(AJP2), 616(PP3), 618(NP5), and 620(AJP3). No reattachment nodes are found for any of these possible target nodes and after node 620 has been evaluated, the process passes through step 500 to step 512 where the parse structure of FIG. 6 is added to the list. Since the tree of FIG. 6 is the initial parse tree, there are no previous trees at step 514 and the process ends at step 516.

Although the present invention has been described above with reference to parse trees, other data structures may be used to represent the syntactic structures of a sentence when practicing the present invention.

Although the present invention has been described with reference to particular embodiments, workers skilled in the art will recognize that changes may be made in form and detail without departing from the spirit and scope of the invention. In particular, although the examples above use a token that represents a single word, in other examples of the invention a token can represent a phrase.

What is claimed is:

1. A method of automatically parsing a sentence to form representations of syntactic structures in the sentence, the method comprising:

receiving an input text segment representing the sentence;

forming an initial representation of syntactic structures in the sentence based on the input text segment;

identifying a target node in the initial representation that can accept a reattachment node;

identifying a reattachment node in the initial representation that can be reattached to the target node;

forming a first modified representation by reattaching the reattachment node to the target node;

searching the first modified representation for a second target node that can accept a second reattachment node by beginning the search at the node to which the reattachment node was reattached to form the first modified representation;

forming a second modified representation by reattaching the second reattachment node to the second target node; and providing at least two modified representations of syntactic structures as possible syntactic structures in the sentence as output to an application.

2. The method of claim 1 further comprising forming a third modified representation of syntactic structures by modifying the syntactic structures of the initial representation.

3. The method of claim 2 wherein forming a third modified representation comprises:
   identifying a third reattachment node in the initial representation that can be reattached to the target node in the initial representation; and
   reattaching the third reattachment node to the target node in the initial representation to form the third modified representation.

4. The method of claim 3 wherein identifying a third reattachment node comprises searching only that portion of the initial representation that is after the reattachment node in the initial representation.

5. The method of claim 4 further comprising determining that the initial representation of syntactic structures should not be provided as a possible representation of syntactic structures based on the second modified representation.

6. The method of claim 1 further comprising providing at least the first modified representation and the second modified representation of the syntactic structures to the application and allowing the application to select one of the representations.

7. A computer-readable storage medium having computer-executable instructions that when executed by a processor cause the processor to perform steps comprising:
   parsing an input sentence to form an initial syntactic parse structure for the entire sentence;
   modifying the initial syntactic parse structure to form a second syntactic parse structure for the entire sentence;
   modifying the second syntactic parse structure to form a third syntactic parse structure for the entire sentence;
   after modifying the second syntactic parse structure to form the third syntactic parse structure, modifying the initial syntactic parse structure to form a fourth syntactic parse structure for the entire sentence; and
   identifying at least the second, third and fourth syntactic parse structures as possible parse structures for the entire sentence.

8. The computer-readable storage medium of claim 7 wherein the step of modifying the initial parse structure to form a second syntactic parse structure comprises:
   searching the initial parse structure for a target node that can accept a reattachment node;
   searching the initial parse structure for a reattachment node that can be reattached to the target node; and
   reattaching the reattachment node to the target node.

9. The computer-readable storage medium of claim 8 wherein searching the initial parse structure comprises performing a left-to-right depth-first search.

10. The computer-readable storage medium of claim 8 wherein modifying the initial parse structure to form the fourth syntactic parse structure comprises searching for an additional reattachment node that can be reattached to the target node.

11. The computer-readable storage medium of claim 10 wherein searching for an additional reattachment node comprises searching the initial syntactic parse structure beginning after the reattachment node that was reattached to the target node to form the second syntactic parse structure.

12. The computer-readable storage medium of claim 7 further comprising determining not to identify a syntactic parse structure as a possible parse structure after modifying the syntactic parse structure to form another syntactic parse structure.

13. The computer-readable storage medium of claim 12 further comprising not further modifying the syntactic parse structure to form additional syntactic parse structures after determining not to identify the parse structure as a possible parse structure.

14. The computer-readable storage medium of claim 7 further comprising providing at least the second, third and fourth syntactic parse structures to an application and allowing the application to select one of the provided syntactic parse structures as the syntactic parse structure for the sentence.

15. A computer-readable storage medium having computer-executable instructions that when executed by a processor cause the processor to perform steps comprising:
   forming an initial representation of syntactic structures in a sentence;
   identifying a target node in the initial representation that can accept a reattachment node;
   identifying a reattachment node in the initial representation that can be reattached to the target node;
   forming a first modified representation by reattaching the reattachment node to the target node;
   searching the first modified representation for a second target node that can accept a second reattachment node by beginning the search at the node to which the reattachment node was reattached to form the first modified representation;
   forming a second modified representation by reattaching the second reattachment node to the second target node; and
   providing at least two modified representations of syntactic structures as possible syntactic structures in the sentence.

16. The computer-readable storage medium of claim 15 further comprising forming a third modified representation of syntactic structures by modifying the syntactic structures of the initial representation.

17. The computer-readable storage medium of claim 16 wherein forming a third modified representation comprises:
   identifying a third reattachment node in the initial representation that can be reattached to the target node in the initial representation; and
   reattaching the third reattachment node to the target node in the initial representation to form the third modified representation.

18. The computer-readable storage medium of claim 17 wherein identifying a third reattachment node comprises searching only that portion of the initial representation that is after the reattachment node in the initial representation.

19. The computer-readable storage medium of claim 18 further comprising determining that the initial representation of syntactic structures should not be provided as a possible representation of syntactic structures based on the second modified representation.

20. The computer-readable storage medium of claim 15 further comprising providing at least the first modified representation and the second modified representation of the syntactic structures to an application and allowing the application to select one of the representations.

* * * * *